United States Patent [19]
Delcarson

[11] Patent Number: 5,839,458
[45] Date of Patent: Nov. 24, 1998

[54] DISHWASHER CLEAN/DIRTY INDICATOR

[76] Inventor: Kevin James Delcarson, 3741 Ashford Dr., Bedford, Tex. 76021

[21] Appl. No.: 916,300

[22] Filed: Aug. 22, 1997

[51] Int. Cl.$^6$ .................................................... A47L 15/42
[52] U.S. Cl. ............................ 134/113; 116/216; 116/221
[58] Field of Search .................................... 116/216, 218, 116/221, 280, 284, 297, 298, 303, 305; 374/141, 206; 134/113

[56] References Cited

U.S. PATENT DOCUMENTS

| | | |
|---|---|---|
| 3,608,514 | 9/1971 | Dunn . |
| 3,813,942 | 6/1974 | Guth ........................................ 116/216 |
| 4,081,999 | 4/1978 | Lenken .................................... 116/221 |
| 4,129,954 | 12/1978 | Hulteen . |
| 4,653,423 | 3/1987 | Schafer . |
| 5,143,453 | 9/1992 | Weynant Nee Girones ........... 116/216 |
| 5,302,028 | 4/1994 | Carey ...................................... 116/221 |

*Primary Examiner*—Diego F.F. Gutierrez
*Assistant Examiner*—Andrew Hirshfeld

[57] ABSTRACT

A dishwasher clean/dirty indicator is disclosed for showing a user whether dishes in a dishwasher are clean or dirty. The indicator is configured either as a portable or built-in device. The portable configuration is described in this abstract which begins with a frame (32), containing bearing surfaces. The frame rests within a dish rack (60) of a dishwasher (58). A release arm (44) with vertical and horizontal sections, pivots on the frame bearing surfaces. A drinking glass (62) or similar dish is placed on the horizontal section of the release arm when the dishwasher is loaded, holding the release arm in the loaded position. A release spring (54) retracts the release arm to the unloaded position when the dishwasher is emptied. A latch (48) is pivotably connected to the vertical section of the release arm. Affixed to the frame is a faceplate (34) including sign members (39) with the words clean and dirty, and a spring housing (38). Within the spring housing is a bimetallic spring (36) comprising a shaft (64). Affixed to the shaft is an indicating pointer (40). In the loaded position, the latch is in close proximity with the indicating pointer. As dishes are washed, heat introduced to the dishwasher during a normal dishwasher cycle causes the bimetallic spring to rotate the pointer toward the clean position. The latch tilts as the pointer rotates past it. Once cleared, gravity returns the latch to its upright position, latching the pointer in the clean position. The pointer remains in the clean position until the dishwasher is emptied. Emptying the dishwasher releases the release arm to the unloaded position causing the latch to move away from the pointer, which automatically re-sets the indicator to the dirty position.

20 Claims, 8 Drawing Sheets

DISHWASHER CLEAN/DIRTY INDICATOR

CROSS-REFERENCE TO RELATED APPLICATION

Not Applicable

STATEMENT REGARDING FEDERALLY SPONSORED RESEARCH

Not Applicable

REFERENCE TO MICROFICHE APPENDIX

Not Applicable

FIELD OF THE INVENTION

This invention relates to an improved indicator with automatic re-set feature, for showing a user the clean or dirty condition of dishes in a dishwasher therein, as a result of a temperature change that takes place when heat is introduced to the dishwasher during a normal cleaning cycle.

BACKGROUND OF THE INVENTION

U.S. Pat. Nos. 3,608,514 and 4,653,423 disclose indicating devices for dishwashers that collect water during the wash cycle to indicate whether the dishes inside are clean or dirty. Both patents describe indicators that employ float devices that move vertically when water is introduced to the indicators during the wash cycle. The vertical movement of the floats provides an indication of clean or dirty status. In both patents, a raised float indicates that the dishes are clean and a lowered float indicates that the dishes are dirty. While innovative in design, both patents have the potential for providing a false indication of clean or dirty condition. The invention in U.S. Pat. No. 3,608,514 resets the indicator to the dirty position as soon as the dishwasher door is opened. This is a problem for individuals who need a few clean dishes quickly without being able to empty the entire dishwasher. As soon as the door is re-closed, the indicator will show that the dishes are dirty when in actuality, the remaining dishes are clean. The invention in U.S. Pat. No. 4,653,423 does not have an automatic reset feature at all. The subject device requires its users to manually reset it by emptying water from the cylindrical casing. If the user forgets to empty the casing, it is possible that the indicator will show that the dishes are clean when in actuality, the dishes are dirty.

SUMMARY OF THE INVENTION

Accordingly, it is an object of the present invention to provide an improved indicator for a dishwasher that automatically shows the clean or dirty condition of dishes in the dishwasher, without manual intervention by the user.

It is another object of the present invention to ensure that the indicator automatically registers dirty as soiled dishes are being loaded into the dishwasher, and that it stays in the dirty position until the dishwashing cycle is activated.

It is yet another object of the present invention to ensure that the indicator automatically moves from the dirty position to the clean position during the dishwashing cycle and that after completion of the cycle, it remains in the clean position for partially unloaded dishwashers.

It is yet another object of the present invention to ensure that the indicator automatically re-sets itself to the dirty position upon removal of the last dish, as the dishwasher is being fully unloaded.

It is yet another object of the present invention to have both portable and built-in configurations that can be placed in existing dishwashers, or manufactured into new dishwashers, respectively, with no user installation requirements.

The foregoing and other objects of this invention are achieved by providing a dishwasher clean/dirty indicator that shows a user whether dishes in a dishwasher are clean or dirty. The indicator is configured either as a portable or built-in device. The portable configuration is described in this summary which begins with a frame, containing bearing surfaces. The frame rests within a dish rack of a dishwasher. A release arm with vertical and horizontal sections, pivots on the frame bearing surfaces. A drinking glass or similar dish is placed on the horizontal section of the release arm when the dishwasher is loaded, holding the release arm in the loaded position. A release spring retracts the release arm to the unloaded position when the dishwasher is emptied. A latch is pivotably connected to the vertical section of the release arm. Affixed to the frame is a faceplate including the words clean and dirty, and a spring housing. Within the spring housing is a bimetallic spring comprising a shaft. Affixed to the shaft is an indicating pointer. In the loaded position, the latch is in close proximity with the indicating pointer. As dishes are washed, heat introduced to the dishwasher during a normal dishwasher cycle causes the bimetallic spring to rotate the pointer toward the clean position. The latch tilts as the pointer rotates past it. Once cleared, gravity returns the latch to its upright position, latching the pointer in the clean position. The pointer remains in the clean position until the dishwasher is emptied. Emptying the dishwasher releases the release arm to the unloaded position causing the latch to move away from the pointer, which automatically re-sets the indicator to the dirty position.

LIST OF REFERENCE NUMERALS

Figure 22:
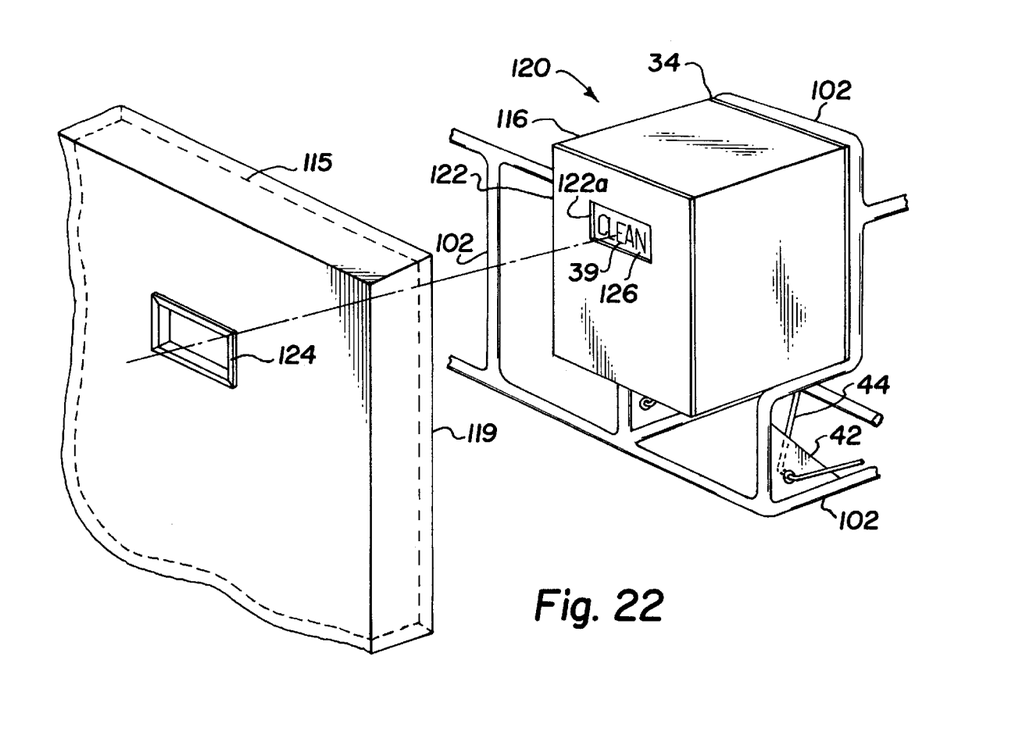
FIG. 22 is an upper right frontal perspective of a further embodiment of the built-in indicator of the present invention, showing an extended secondary indicating disk, with casing and dishwasher door viewing windows.
Figure 23:
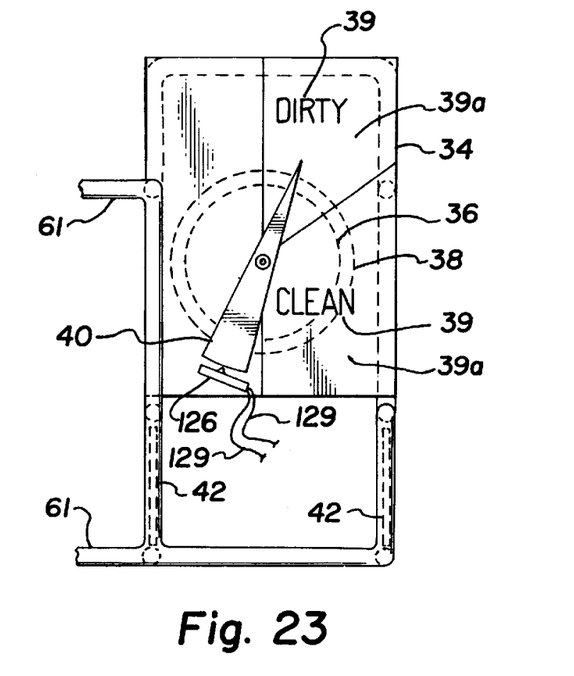
FIG. 23 is a front elevation of a further embodiment of the built-in indicator of the present invention with casing, release arm, and release spring removed, showing the addition of an electrical contact switch.
Figure 24:
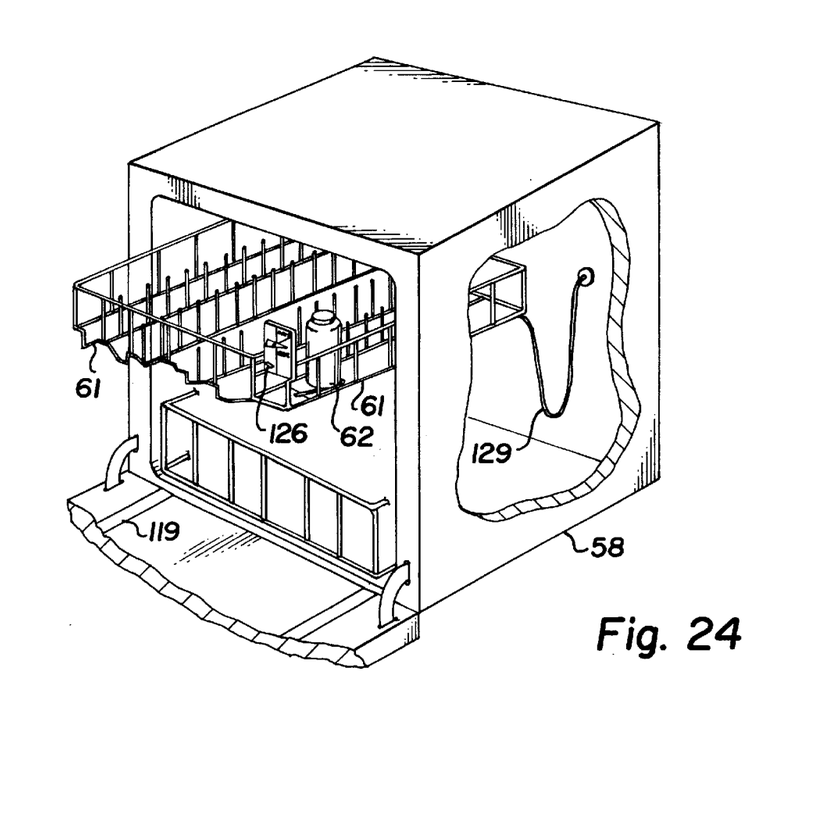
FIG. 24 is an upper right frontal perspective of a dishwasher containing the built-in indicator of FIG. 23, with cut-away section showing the looped configuration of the electrical conductors.

30 Portable dishwasher clean/dirty indicator, overall invention (FIGS. 1, 2, 3, 4, 5, 8)
32 Frame (FIGS. 1,3,4,5,6,8, 10, 11, 12, 14, 17, 18)
32a Side rod (FIG. 6)
32b Transverse rod (FIG. 6)
32c Lower-front rod (FIG. 6)
32d Mid-rod (FIG. 6)
32e Upper-front rod (FIG. 6)
32f Top rod (FIG. 6)
33 Base (FIG. 6)
34 Faceplate (FIGS. 1, 3, 4, 5, 8, 10, 11, 12, 14, 19, 20, 21, 22, 23)
35 Lower-front section (FIG. 6)
36 Bimetallic spring (FIGS. 3, 4, 5, 8, 14, 21, 23)
37 Upper-front section (FIG. 6)
38 Spring housing (FIGS. 3, 4, 5, 8, 14, 21, 23)
39 Sign member (FIGS. 1, 3, 12, 13, 19, 20, 22, 23)
39a Colored backdrop (FIGS. 3, 19, 23)
40 Indicating pointer (FIGS. 1, 3, 4, 5, 10, 14, 19, 20, 21, 23)
42 Bearing plate (FIGS. 1, 3, 4, 5, 8, 10, 11, 12, 14, 17, 19, 20, 21, 22, 23)
42a Pivot hole (FIGS. 1, 4, 5, 10, 11, 14, 17)
44 Release arm (FIGS. 1, 3, 4, 5, 7, 8, 10, 11, 12, 18, 19, 20, 21, 22)
44a Vertical section (FIG. 7)
44b Horizontal section (FIG. 7)
44c Latch shaft (FIG. 7)
44d Latch rest (FIG. 7)
44e Release-arm stop (FIG. 7)
44f Pivot shaft (FIG. 7)
44g Flexible section (FIGS. 1, 4, 5, 7, 8, 10, 11, 14, 15, 16, 19, 21)
48 Latch (FIGS. 1, 3, 4, 5, 9, 10, 12, 19, 20, 21)
48a Indicator rest (FIG. 9)
48b Latch contactor (FIG. 9)
48c Latch counterbalance (FIG. 9)
48d Backrest (FIG. 9)
50 Latch retainer (FIGS. 1, 3, 4, 5, 9, 10, 12, 19, 20, 21)
54 Release spring (FIGS. 3, 4, 5, 8, 10, 11, 12, 19, 20, 21)
56 Casing (FIGS. 1, 4, 5, 14, 17, 18)
58 Dishwasher (FIGS. 2, 24)
60 Standard dish rack (FIG. 2)
61 Modified dish rack (FIGS. 19, 23, 24)
62 Drinking glass (FIGS. 1, 2, 4, 14, 19, 24)
64 Shaft (FIGS. 4, 5, 14, 21)
66 Cutout opening (FIG. 1)
70 See-through indicator, overall invention (FIG. 10)
72 See-through casing (FIG. 10)
80 Rotating-disk indicator, overall invention (FIGS. 11, 12)
82 Window casing (FIG. 11)
82a Window (FIG. 11)
84 Indicating disk (FIGS. 11, 12, 13)
84a Large cutout (FIG. 13)
84b Small cutout (FIG. 13)
86 Disk stop (FIG. 12)
90 Simplified indicator, overall invention (FIG. 14)
92 Combined-release arm (FIGS. 14, 15, 16)
92a Flexible latch (FIGS. 14, 15, 16)
92b Leaf-release spring (FIGS. 14, 15, 16)
98 Pinned-release arm (FIG. 17)
98a Vertical portion (FIG. 17)
98b Horizontal portion (FIG. 17)
98c Cantilevered pin (FIG. 17)
99 Slotted-bearing plate (FIG. 18)
99a Pivot slot (FIG. 18)
99b Slot nub (FIG. 18)
100 Built-in indicator, overall invention (FIG. 19)
102 Built-in frame (FIGS. 19, 20, 21, 22)
110 Built-in window indicator, overall invention (FIGS. 20, 21)
112 Extended shaft (FIGS. 20, 21)
114 Secondary indicating pointer (FIGS. 20, 21)
115 Dishwasher door cavity (FIGS. 21, 22)
116 Shroud casing (FIGS. 20, 21, 22)
117 Viewing window (FIGS. 20, 21)
118 Standard dishwasher door (FIG. 2)
119 Modified dishwasher door (FIGS. 20, 21, 22, 24)
120 Built-in rotating disk indicator, overall invention (FIG. 22)
122 Window plate (FIG. 22)
122a Plate window (FIG. 22)
124 Disk viewing window (FIG. 22)
126 Secondary indicating disk (FIG. 22)
126 Contact switch (FIGS. 23, 24)
129 Electrical conductor (FIGS. 23, 24)

DETAILED DESCRIPTION OF THE INVENTION

The dishwasher clean/dirty indicator covered by this invention can assume one of two distinct configurations. The first is a portable design that can be used in most commercially available household dishwashers. The second is a built-in design that would be incorporated into the dishwasher design by the dishwasher manufacturer. Both configurations are considered as preferred embodiments. For purposes of this detailed description, the portable design is covered first, followed by a description of the built-in design.

Figure 1:
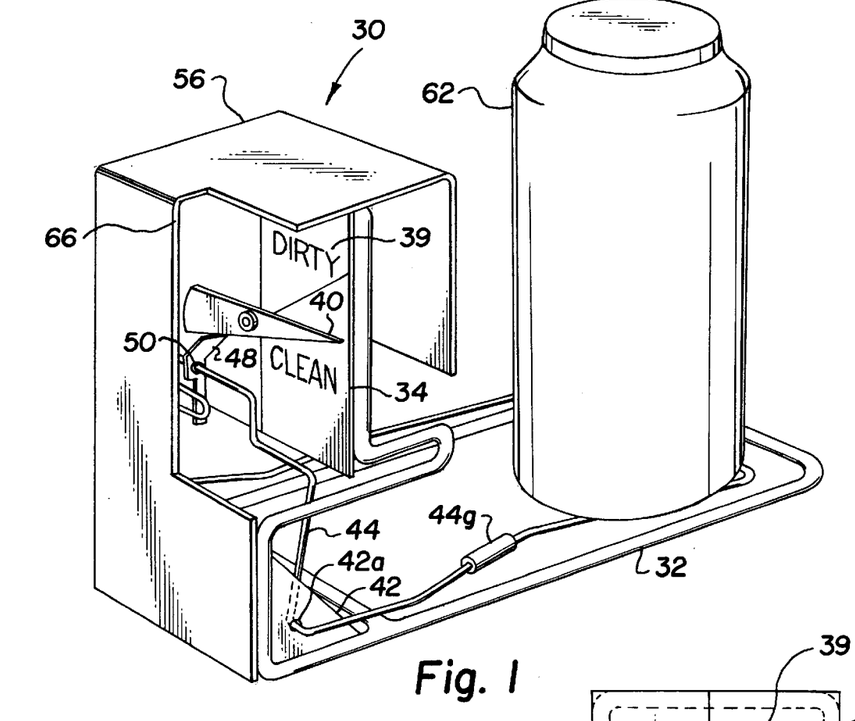
FIG. 1 is an upper right frontal perspective of the portable dishwasher clean/dirty indicator of the present invention.
Figure 2:
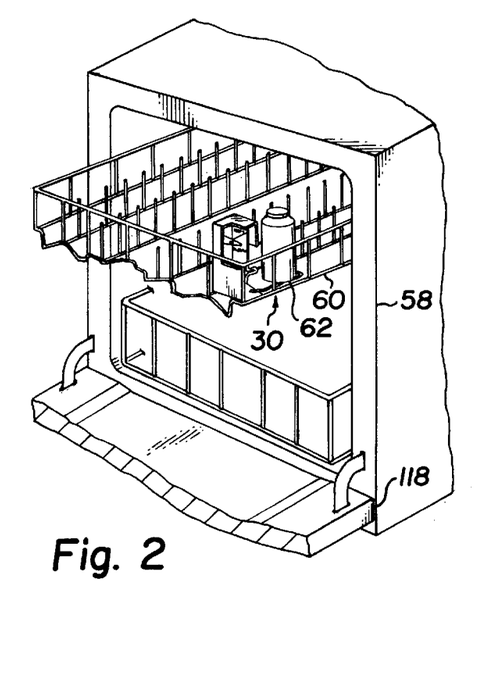
FIG. 2 is an upper right frontal perspective of the portable indicator of FIG. 1, placed in a dishwasher.

Referring first to FIGS. 1 through 5 showing the portable configuration, indicator 30 is designed to be placed in dish rack 60 of dishwasher 58 for indicating whether dishes in the dishwasher are clean or dirty. FIGS. 1 through 5 show indicator 30 in its normal upright orientation. To assist the reader in this written description, the front of indicator 30 is defined as the portion that faces dishwasher door 118 when placed in dish rack 60 of dishwasher 58, as shown in FIG 2. The front of indicator 30 is the portion that a user would see when he or she opens the dishwasher door to view indicator 30.

Indicator 30 comprises frame 32 which is used as a common structure for mounting the indicator components. Frame 32 can be made of plastic rod, plastic-coated metal rod, or other similar materials. Frame 32 could be manufactured using a number of techniques. One technique would be to bend metal rod at predetermined locations, then dipping it in a plastic-type material for providing corrosion resistance. Another technique would be to form frame 32 from a plastic material by injection molding. One skilled in the art would be able to identify other acceptable materials and methods for forming frame 32.

Figure 6:
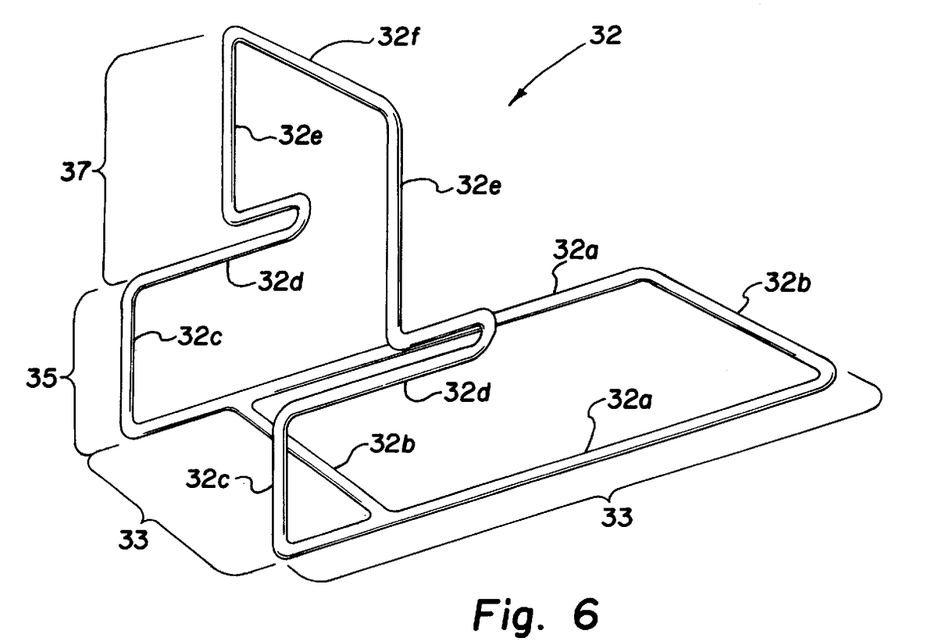
FIG. 6 is an upper right frontal perspective of the frame of the portable indicator of the present invention.

Referring to FIG. 6, frame 32 begins with a base 33 comprising two parallel side rods 32a and two transverse rods 32b, oriented in a horizontal plane. The side rods are spaced apart by a distance of 2½ to 3 inches to ensure that indicator 30 rests properly in a typical dish rack 60. Base 33 is the bottom portion of frame 32 which rests on dish rack 60. For purposes of further discussion, the longitudinal direction of indicator 30 is defined as the direction that is parallel to side rods 32a of base 33, and the transverse direction of indicator 30 is defined as the direction that is perpendicular to side rods 32a of base 33.

Figure 3:
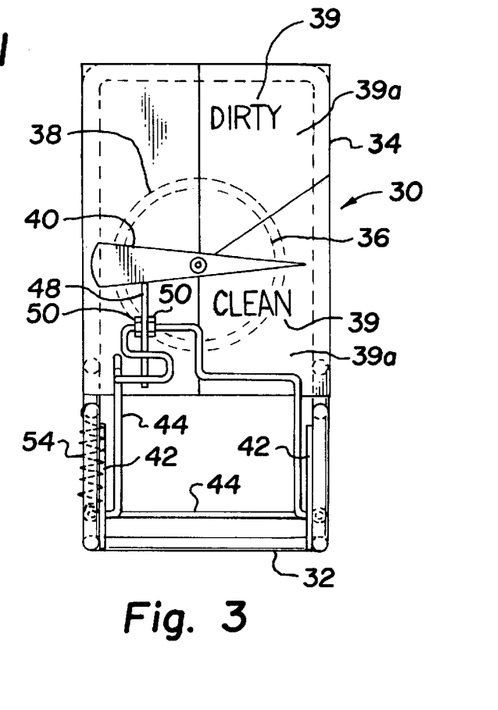
FIG. 3 is a front elevation view of the portable indicator of FIG. 1, with indicating pointer latched in the clean position.
Figure 4:
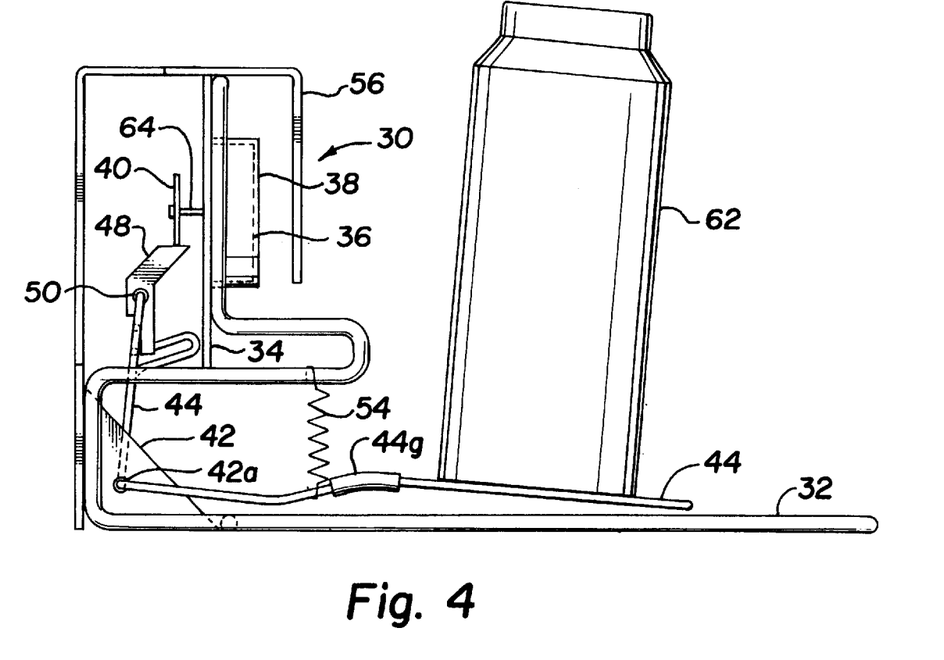
FIG. 4 is a side elevation view of the portable indicator of FIG. 1, in the loaded position, with a drinking glass placed on the release arm.
Figure 5:
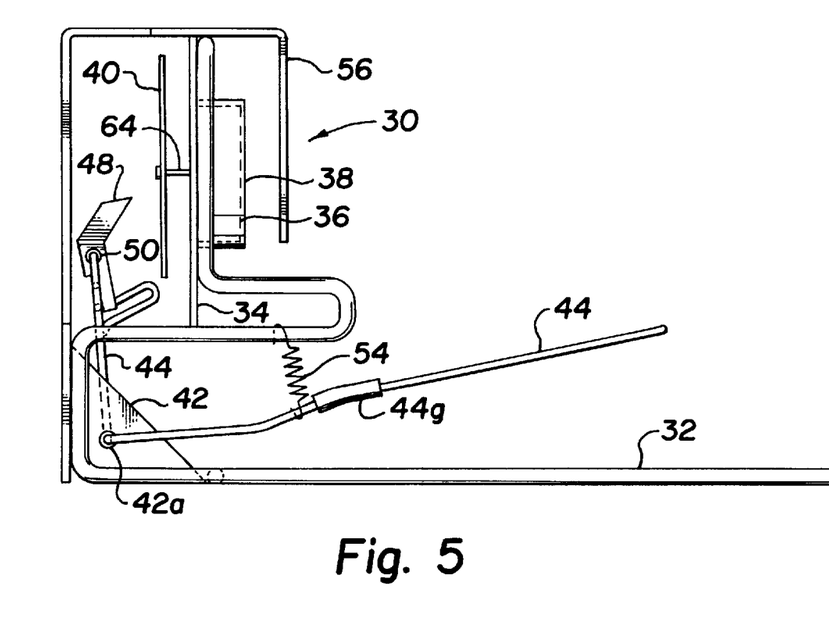
FIG. 5 is a side elevation view of the portable indicator of FIG. 1, in the unloaded position.

The design of frame 32 continues with a lower front section 35 comprising two vertically oriented lower-front rods 32c attached to base 33. Referring to FIGS. 3, 4 and 5, a bearing plate 42 is located at the intersection of each side rod 32a and lower-front rod 32c of frame 32. Bearing plate 42 could either be molded into frame 32 or manufactured as a separate part. If manufactured as a separate part, bearing plate 42 could be formed from a plastic material with clips that snap-on to frame 32. Each of the two bearing plates 42 are oriented vertically in the side planes of indicator 30. The side planes of indicator 30 are defined as those which contain side rods 32a and lower-front rods 32c. Each of the two bearing plates 42 contain pivot holes 42a that serve as bearing surfaces for release arm 44.

Referring again to FIG. 6, two horizontally oriented mid-rods 32d are attached to the lower-front section 35 of frame 32. Portable indicator 30 uses U-shaped mid-rods as shown. The purpose of the mid-rods is to provide lateral support for indicator 30 when it is resting in dish rack 60. The mid-rods are approximately 2 inches in length, measured outside to outside in its U-shape configuration, to ensure that they span at least two sections of a typical dish rack 60. The mid-rods also provide an upper attachment point for release spring 54. U-shaped mid-rods are used in the portable embodiment to enable frame 32 to be formed from a single piece of rod by bending it in the proper locations. If a different method of manufacturing is utilized, then U-shaped mid-rods would not be required, and could be replaced by straight rods. Frame 32 is completed with an upper-front section 37 comprising two vertically oriented upper-front rods 32e and one horizontally oriented top rod 32f. The upper-front section 37 of frame 32 is used as a support structure for faceplate 34.

Referring to FIGS. 1 and 3, faceplate 34 is either molded into frame 32 as a single component or manufactured as a separate part. Injection molding would be one acceptable method for manufacturing frame 32 and faceplate 34 either as a combined part or as separate parts. If faceplate 34 is manufactured as a separate part, then it could be attached to frame 32 using a suitable method. One method would be to form clips into faceplate 34 that would allow it to be snapped-on to the rod structure of frame 32. One skilled in the art would be able to determine other possible ways for attaching faceplate 34 to frame 32, if faceplate 34 were not molded into frame 32 as a single component.

Faceplate 34 provides a surface for sign members 39 containing the words clean and dirty which are used by the dishwasher user to determine the condition of dishes in dishwasher 58. Faceplate 34 also provides a location for colored backdrops 39a behind sign members 39. The color red is located behind the word dirty and the color green is located behind the word clean. Color coding the faceplate would help provide the user with a quick check of clean or dirty dish condition. Red being the international symbol for stop, don't remove dirty dishes. Green for go, remove clean dishes. Of course one skilled in the art would know that color coding is not necessary to build a workable indicator 30.

Figure 8:
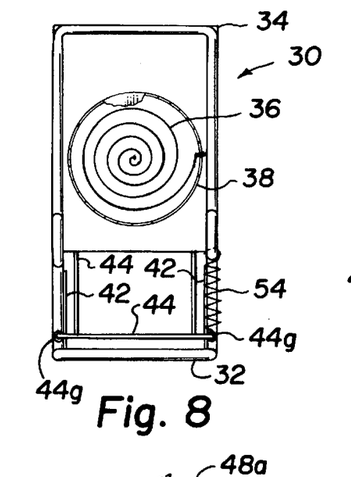
FIG. 8 is a rear elevation view of the portable indicator of FIG. 1, with back portion of spring housing removed to show the bimetallic spring.

Referring to FIGS. 4, 5, and 8, the backside of faceplate 34 provides a surface for attaching spring housing 38. The spring housing encloses a heat-activated bimetallic spring 36. Several methods are possible for attaching spring housing 38 to faceplate 34. For the preferred embodiments, it is envisioned that the spring housing would snap into faceplate 34 with clips that are molded into the part. One skilled in the art would know that several frame and faceplate design configurations are possible for enclosing bimetallic spring 36.

Heat activated bimetallic spring 36 comprises a shaft 64. The shaft in turn, comprises an indicating pointer 40. Shaft 64 is horizontally oriented as shown in FIGS. 4 and 5. Indicating pointer 40 is oriented to rotate in a vertical plane, parallel to faceplate 34, approximately ¼ inch from its surface. Bimetallic spring 36 is held in place by spring housing 38. FIG. 8 shows a rear view of indicator 30 with the rear portion of spring housing 38 removed to show bimetallic spring 36. Looking toward the front of indicator 30, shaft 64 rotates clockwise as temperature increases when heat is applied during a dishwasher cycle. Shaft 64 rotates counter-clockwise as temperature decreases after completion of a dishwasher cycle. The length of indicating pointer 40 is less than the width of frame 32 to avoid interference with dish rack 60.

Referring to FIGS. 1, 4, and 5, release arm 44 rotates at two points, one at each pivot hole 42a of bearing plates 42. The purpose of release arm 44 is to provide a support structure for latch 48. FIG. 4 shows a side view of indicator 30 with release arm 44 in the clean position, and FIG. 5 shows a side view of indicator 30 with release arm 44 in the dirty position. It is anticipated that release arm 44 would be manufactured of metal rod with plastic coating or solid plastic material. If metal is used, then release arm 44 could be bent to specifications then dipped in a waterproof coating. If solid plastic material is used, then release arm 44 could be manufactured by injection molding or other plastic forming methods. One skilled in the art would be able to identify additional techniques for manufacturing release arm 44.

Figure 7:
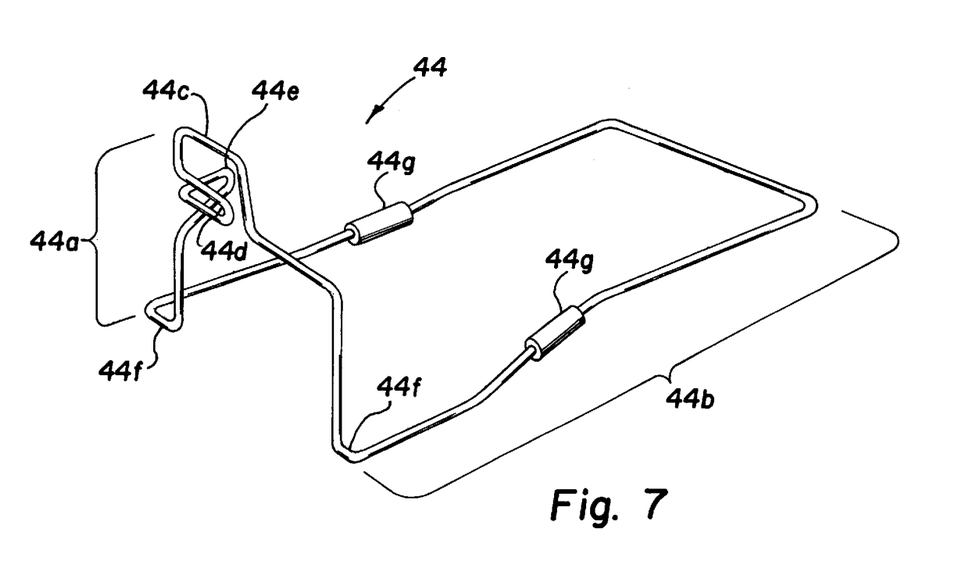
FIG. 7 is an upper right frontal perspective of the release arm of the present invention.

Referring to FIG. 7, release arm 44 is comprised of vertical section 44a, and horizontal section 44b forming an L-shaped configuration as viewed from the side of indicator 30. Vertical section 44a and horizontal section 44b are connected by two pivot shafts 44f, located on each side of release arm 44. Pivot shafts 44f are horizontally oriented in the transverse direction of indictor 30, and serve as the points where release arm 44 rotates in pivot holes 42a.

Vertical section 44a comprises bends at several predetermined locations. Starting at a first pivot shaft 44f shown at the lowest point of FIG. 7, vertical section 44a comprises an upward vertical component, transitioning to the left with a horizontal component, transitioning again with an upward vertical component, transitioning to the left again with a horizontal component, serving as a latch shaft 44c for latch 48. Latch shaft 44c is the upper most point of vertical section 44a.

From latch 48, vertical section 44a continues with a downward vertical component, transitioning to the right with a horizontal component serving as a latch rest 44d. From latch rest 44d, vertical section 44a continues with a U-shaped bend transitioning again to a horizontal component. From the horizontal component, vertical section 44a continues with a bend toward the back of indicator 30 in the direction of faceplate 34, transitioning to a U-shaped release-arm stop 44e, used for limiting release arm 44 movement when indicator 30 is in the dirty position shown in FIG. 4. The travel of release arm 44 is limited when release-arm stop 44e makes contact with faceplate 34.

From release-arm stop 44e, vertical section 44a continues toward the front of indicator 30, transitioning with a downward vertical component, ending at a second pivot shaft 44f. It should be noted that the exact shape of vertical section 44a is not critical. When considering alternate configurations, however, one skilled in the art would have to realize that vertical section 44a would need to be designed in a manner that would provide clearance with the components of dish rack 60. Vertical section 44a of the portable embodiment purposely incorporates upward vertical components immediately adjacent to bearing plates 42 to help alleviate the clearance concern.

Referring again to FIG. 7, horizontal section 44b of release arm 44 begins at the first pivot shaft 44f with a horizontal component directed toward the back of indicator 30. The horizontal component slopes slightly downward to put horizontal section 44b in close proximity with frame 32 when release arm 44 is in the dirty position, as shown in FIG. 4. From the horizontal component, horizontal section 44b transitions into a flexible section 44g. It is anticipated that flexible section 44g would be manufactured of rubber or a soft plastic material.

From flexible section 44g, horizontal section 44b continues with an additional horizontal component, paralleling frame side rods 32a. Flexible section 44g ensures that this additional horizontal component contacts side rods 32a when a drinking glass 62, or similar dish, is placed on horizontal section 44b. Horizontal section 44b continues by transitioning to a horizontal component perpendicular to side rods 32a. This perpendicular component completes the first half of horizontal section 44b. The balance of horizontal section 44b is completed with a mirror image of the components thus described, terminating at the opposite pivot shaft 44f.

One skilled in the art would understand that the exact shape of horizontal section 44b is not critical and that the components described could have slightly different configurations. One skilled in the art may also be able to design a horizontal section 44b that eliminates the need for flexible section 44g.

Figure 17:
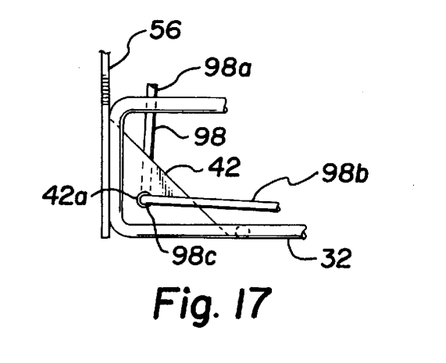
FIG. 17 is a side detail of a further release arm embodiment of the present invention, comprising a cantilevered pin at each pivot point.

As previously described, pivot shafts 44f connect vertical section 44a and horizontal section 44b at pivot holes 42a to form a complete release arm 44. The described configuration locates vertical section 44a on the inside of bearing plate 42 and horizontal section 44b on the outside of bearing plate 42. One skilled in the art would realize that vertical section 44a and horizontal section 44b could be connected on the same side of bearing plate 42. In this case, pivot shafts 44f would be replaced by cantilevered pins 98c, which would protrude through pivot holes 42a from release arm 44, as shown in FIG. 17.

The preceding discussion is based on an arrangement that uses a pivoting release arm 44. One skilled in the art would realize that a sliding release arm would work as an alternate design. With a sliding arrangement, release arm 44 would slide on rails, slots, channels, or rods, that are formed into frame 32. The rails, slots, channels or rods would serve as bearing surfaces that replace pivot holes 42a. While sliding arrangements are possible, no attempt was made to describe them, knowing that they fall within the spirit and scope of the present invention.

Figure 9:
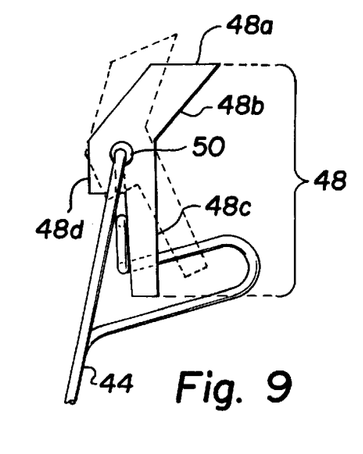
FIG. 9 is a side detail of the latch of the present invention, in both normal and tilted positions.

Referring now to FIG. 9, latch 48 pivots on latch shaft 44c of release arm 44. Latch 48 is shown in its normal position by solid lines and in its rotated position by dashed lines. Latch 48 comprises a top horizontal surface, serving as an indicator rest 48a. Indicator rest 48a holds indicating pointer 40 in the clean position after completion of a dishwashing cycle. Continuing from the upper right corner of latch 48 is a downward sloping surface, serving as a latch contactor 48b. Latch contactor 48b is the surface that indicating pointer 40 contacts when the pointer moves from the dirty position to the clean position during a dishwashing cycle. When contacted, latch 48 rotates on latch shaft 44c, providing clearance for indicating pointer 40 to move past latch 48 during normal dishwasher operation.

Immediately below latch contactor 48b is a vertical component, serving as a latch counterbalance 48c. Latch counterbalance 48c causes latch 48 to return to its normal position when latch contactor 48b is not being contacted by indicating pointer 40. In its normal position, latch counterbalance 48c rests against latch rest 44d of release arm 44. The pivot point of latch 48 is located near the intersection of the latch contactor 48b and latch counterbalance 48c.

The design of latch 48 continues with a backrest 48d, located opposite the upper portion of latch counterbalance 48c. The purpose of backrest 48d is to limit travel of release arm 44 when indicator 30 is in the unloaded position, as shown in FIG. 5. The unloaded position exists when no dishes are in contact with release arm 44. Backrest 48d contacts casing 56 to limit the travel of release arm 44 in the unloaded position. The design of latch 48 is completed with an angled section that parallels latch contactor 48b.

Latch 48 is bounded on both sides by latch retainers 50. Latch retainers 50 keep latch 48 in the proper location on latch shaft 44c. One skilled in the art would understand that the exact dimensions of latch 48 are not critical, however, the dimensions must be compatible with the other components that come into contact with latch 48. Specifically, the dimensions of latch 48 must be compatible with the dimensions of indicating pointer 40, to ensure proper clearance and operation. Also, one skilled in the art would understand that other methods are available for retaining latch 48 on latch shaft 44c.

Referring to FIGS. 4, 5, 6, and 7, release spring 54 connects between mid-rod 32d of frame 32 and horizontal section 44b of release arm 44. Release spring 54 is used to retract release arm 44 from the loaded position shown in FIG. 4 to the unloaded position shown in FIG. 5. The loaded position exists when a drinking glass or similar dish is resting on horizontal section 44b of release arm 44, as shown in FIG. 4. In the unloaded position, latch 48 is moved away from the underside of indicating pointer 40, allowing the pointer to move freely by bimetallic spring 36.

Referring to FIGS. 1, 4, and 5, casing 56 provides a protective enclosure for the critical movable components of indicator 30, including vertical section 44a of release arm 44, latch 48, indicating pointer 40, bimetallic spring 36, and shaft 64. As shown in FIG. 1, casing 56 includes a cutout opening 66 in front of the clean and dirty sign members 39 affixed to faceplate 34, for allowing a user to view the position of indicating pointer 40. It is anticipated that casing 56 would be manufactured of plastic sheet material. One skilled in the art would understand that a variety of casing 56 designs would be acceptable since the exact configuration, dimensions, or materials are not critical.

Figure 18:
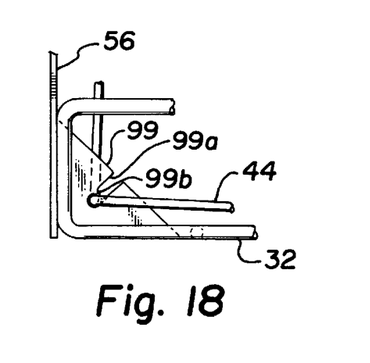
FIG. 18 is a side detail of a slotted-bearing plate of a further embodiment of the present invention.

Turning now to the alternate embodiments, FIGS. 10 through 16 show alternate arrangements for the portable indicator, and FIGS. 19 through 24 show alternate arrangements for the built-in indicator. FIGS. 17 and 18 apply to both the portable and built-in indicators.

Figures 10, 11:
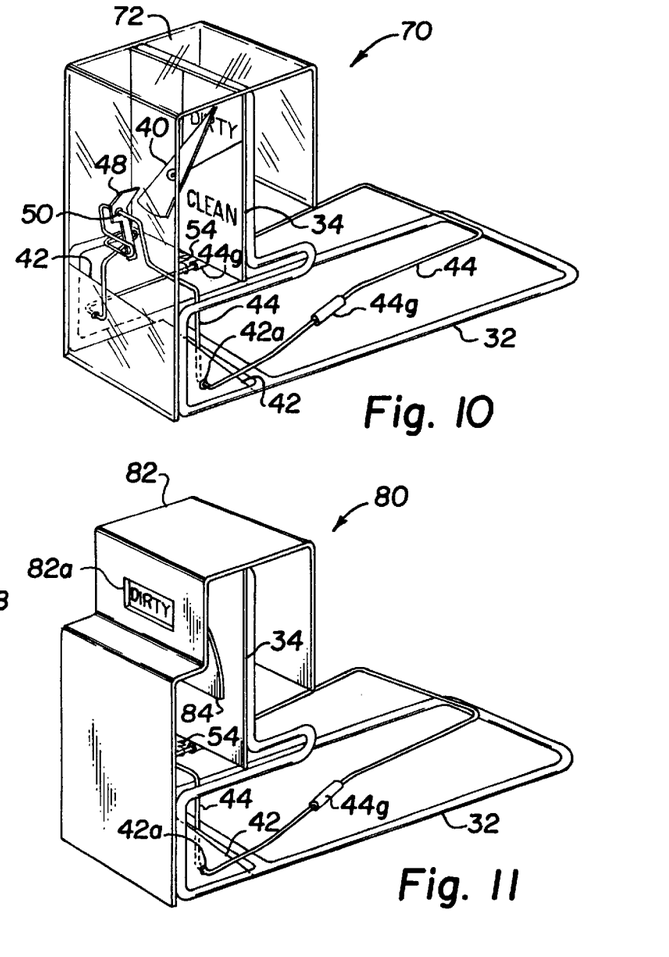
FIG. 10 is an upper right frontal perspective of an embodiment of the portable dishwasher clean/dirty indicator of the present invention containing a clear see-through casing.
FIG. 11 is an upper right frontal perspective of a further embodiment of the portable dishwasher clean/dirty indicator of the present invention containing an indicating disk and viewing window.

Beginning with FIG. 10, see-through indicator 70 is identical to indicator 30 with the exception of see-through casing 72. See-through casing 72 is manufactured of clear plastic or glass material for allowing the user of see-through indicator 70 to view the position of indicating pointer 40 through the clear casing. The clear see-through casing 72 of see-through indicator 70 replaces the opaque casing 56 of indicator 30. See-through casing 72 eliminates the need for cutout opening 66 included in casing 56, since the viewer can see straight through the casing.

Referring to FIG. 11, rotating-disk indicator 80 is similar to indicator 30 with three key differences. First, indicating disk 84 replaces indicating pointer 40, second, window casing 82 replaces casing 56, and third, rotating-disk indicator 80 incorporates disk stops 86. The disk stops can be seen on FIG. 12. Rotating-disk indicator 80 is an alternate embodiment that displays the condition of dishes directly through a window 82a in window casing 82, by displaying sign members 39 containing the words clean and dirty. Sign members 39 are affixed directly to indicating disk 84. As bimetallic spring 36 rotates indicating disk 84, sign members 39 align themselves with window 82a to accurately reflect the condition of dishes in dishwasher 58. Disk stops 86 limit the travel of indicating disk 84 in both the clockwise and counter-clockwise directions, to ensure that sign members 39 properly align themselves with window 82a.

Figure 12:
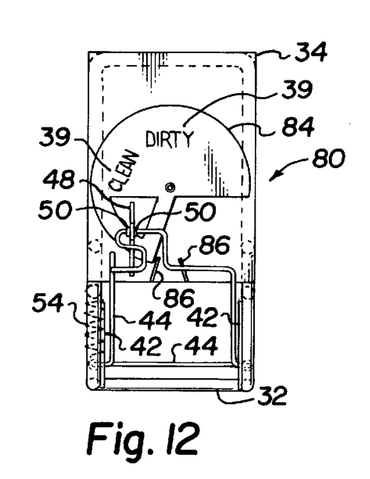
FIG. 12 is a front elevation of the portable indicator of FIG. 11, with casing removed, showing the indicating disk.
Figure 13:
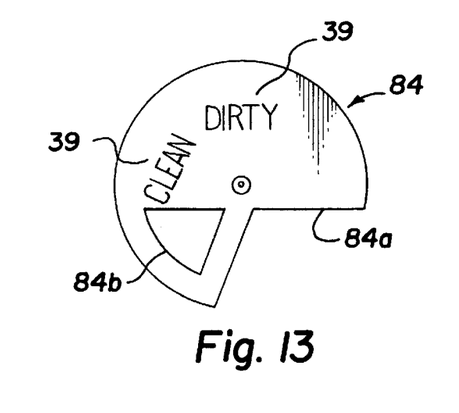
FIG. 13 is a front detail of the indicating disk, with affixed sign members clean and dirty, of the portable indicator of FIG. 11.

FIG. 12 shows a front view of rotating-disk indicator 80. FIG. 13 shows a detail of indicating disk 84. As shown, indicating disk 84 contains a large cutout 84a and a small cutout 84b. The cutouts are necessary to ensure proper cooperation between indicating disk 84 and latch 48. The configuration and operation of latch 48 on indicator 80 is identical to that for latch 48 on indicator 30. The advantage of indicator 80 is that it displays only one word at a time, clean or dirty, which eliminates any possible confusion for the user who is determining condition of dishes in the dishwasher. Indicator 80 may also be more astetically appealing than indicator 30. The rotating disk concept is applicable for both the portable and built-in embodiments covered by the present invention.

Figure 14:
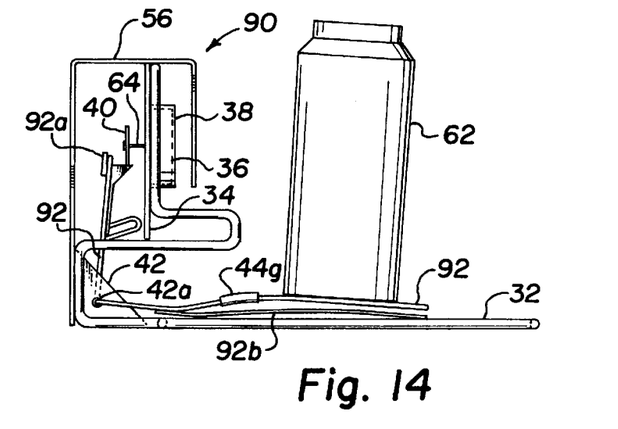
FIG. 14 is a side elevation of a further embodiment of the present invention, showing an alternate release arm assembly comprising a flexible latch and leaf release spring.
Figure 15:
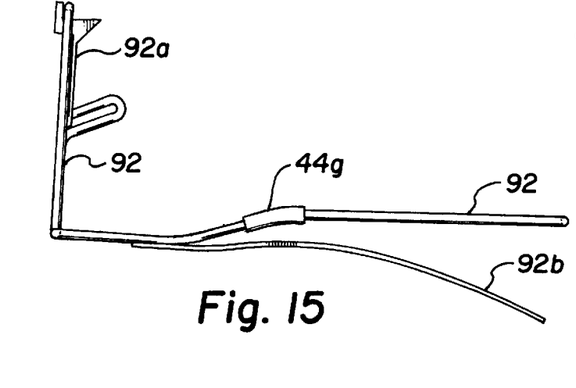
FIG. 15 is a side detail of the release arm, flexible latch, and leaf release spring assembly of FIG. 14.
Figure 16:
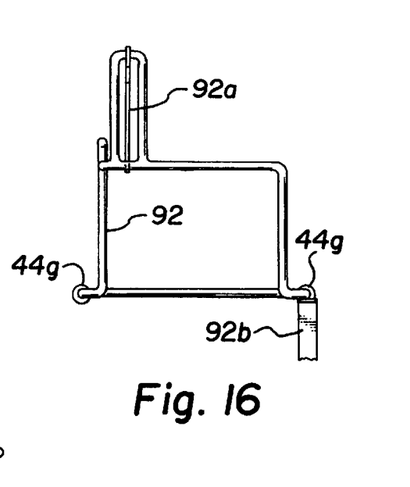
FIG. 16 is a front detail of the release arm, flexible latch, and leaf release spring assembly of FIG. 14.

Referring now to FIG. 14, simplified indicator 90 is identical to indicator 30 with the exception of combined-release arm 92, which replaces release arm 44. Combined-release arm 92 incorporates several key elements of the invention, including flexible latch 92a and leaf-release spring 92b. Flexible latch 92a replaces latch 48 of indicator 30, and leaf-release spring 92b replaces release spring 54 of indicator 30. FIGS. 15 and 16 show combined-release arm 92 in closer detail. The purpose of combined-release arm 92 is to reduce manufacturing costs and provide a simpler design with fewer components. It is envisioned that combined-release arm 92, containing flexible latch 92a and leaf-release spring 92b, would be manufactured from flexible plastic material as a single component, using injection molding or similar method.

The dimensions and material of combined-release arm 92 would need to be optimized by one skilled in the art to ensure that flexible latch 92a and leaf-release spring 92b provide the flexibility needed to serve the same functions as latch 48 and release spring 54, respectively, of indicator 30. Specifically, flexible latch 92a would hold indicating pointer 40 in the clean position after completion of a normal dishwashing cycle, and leaf-release spring 92b would retract combined-release arm 92 from the loaded position to the unloaded position when a drinking glass 62 or similar dish is removed from the combined-release arm.

Referring now to FIG. 17, pinned-release arm 98 is an alternate embodiment for release arm 44. Pinned-release arm 98 can be used with any of the portable or built-in embodiments covered by the present invention. Pinned-release arm 98 connects vertical portion 98a and horizontal portion 98b on the same side of bearing plate 42, instead of opposite sides used on release arm 44. In this case, pinned-release arm 98 uses a cantilevered pin 98c, instead of a pivot shaft 44f. Cantilevered pin 98c is affixed to pinned-release arm 98 at the point where vertical portion 98a and horizontal portion 98b are jointed. Cantilever pin 98c projects through pivot hole 42a in bearing plate 42, and is the bearing surface on which pinned-release arm 98 rotates.

Referring now to FIG. 18, slotted-bearing plate 99 is an alternate embodiment for bearing plate 42. Slotted-bearing plate 99 can be used with any of the portable or built-in embodiments covered by the present invention. The purpose of slotted-bearing plate 99 is to assist the manufacturing process by simplifying the assembly of the present invention. Slotted-bearing plate 99 comprises a pivot slot 99a and slot nubs 99b. During assembly, one would slide pivot shaft 44f of release arm 44 down pivot slot 99a, past slot nubs 99b, snapping release arm 44 into place as it bottoms-out in the slot. One skilled in the art would need to optimize the dimensions of slot nubs 99b so they would allow release arm 44 to snap into place during assembly and retain it thereafter.

The alternate embodiments shown in FIGS. 10 through 18 are some of the many variations possible for designing and building a portable dishwasher clean/dirty indicator. Most of these alternates are also applicable for the built-in embodiments, covered in subsequent paragraphs. One skilled in the art would realize that there are also many other variations and combinations that could be used to provide a workable arrangement. As an example of the many combinations that are possible, one skilled in the art would realize that combined-release arm 92 could easily be incorporated into rotating-disk indicator 80.

Figure 19:
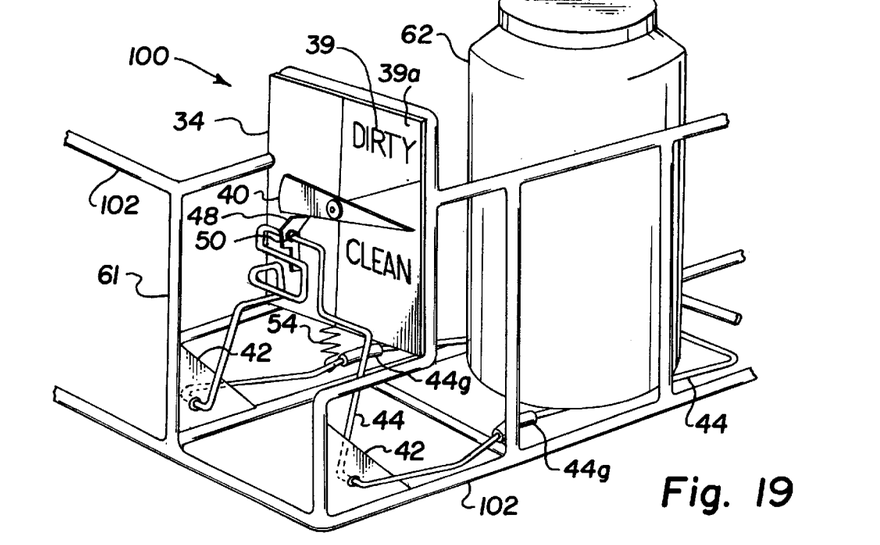
FIG. 19 is an upper right frontal perspective of a further embodiment of the present invention, showing a built-in dishwasher clean/dirty indicator, with casing removed.

The discussion now turns to the built-in embodiments. Referring first to FIG. 19, built-in indicator 100 is identical to portable indicator 30, with the exception of built-in frame 102 which replaces frame 32. Frame 102 is formed directly into modified dish rack 61 by the dishwasher manufacturer, becoming an integral part of the dish rack. Modified dish rack 61 replaces standard dish rack 60. One skilled in the art would need to design modified dish rack 61 to incorporate frame 102, while maintaining the dishwasher's design requirements and operational characteristics. Once incorporated, the components of built-in indicator 100 would be assembled to frame 102 in a similar manner as they would be for frame 32 in portable indicator 30.

Figure 20:
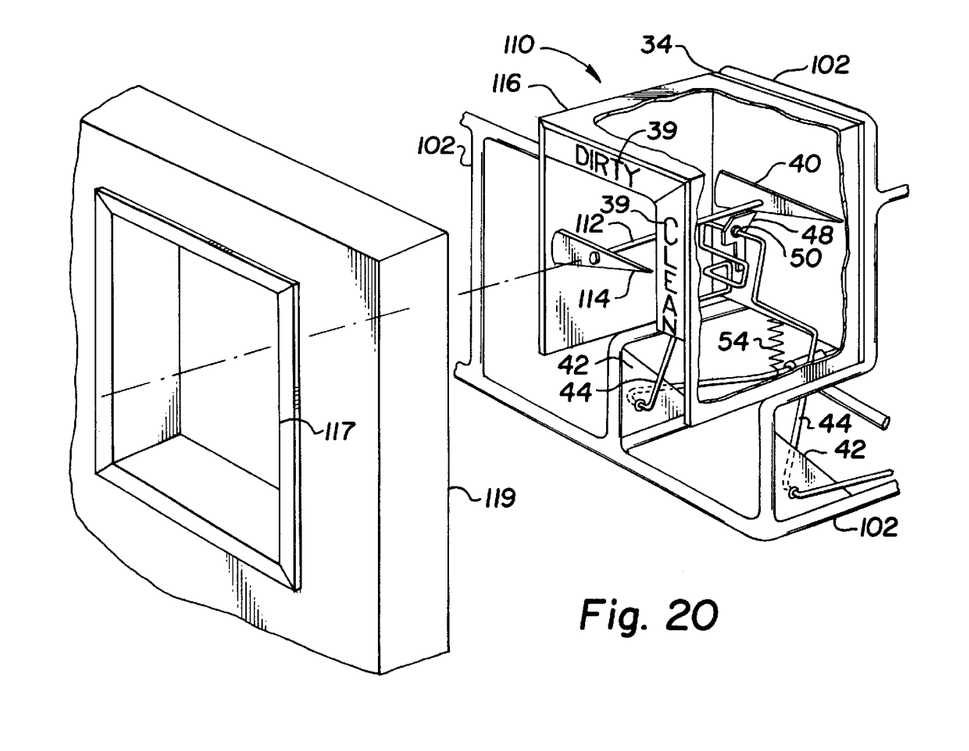
FIG. 20 is an upper right frontal perspective of a further embodiment of the built-in indicator of the present invention, with cut-away shroud casing, showing an extended secondary indicating pointer and dishwasher door viewing window.
Figure 21:
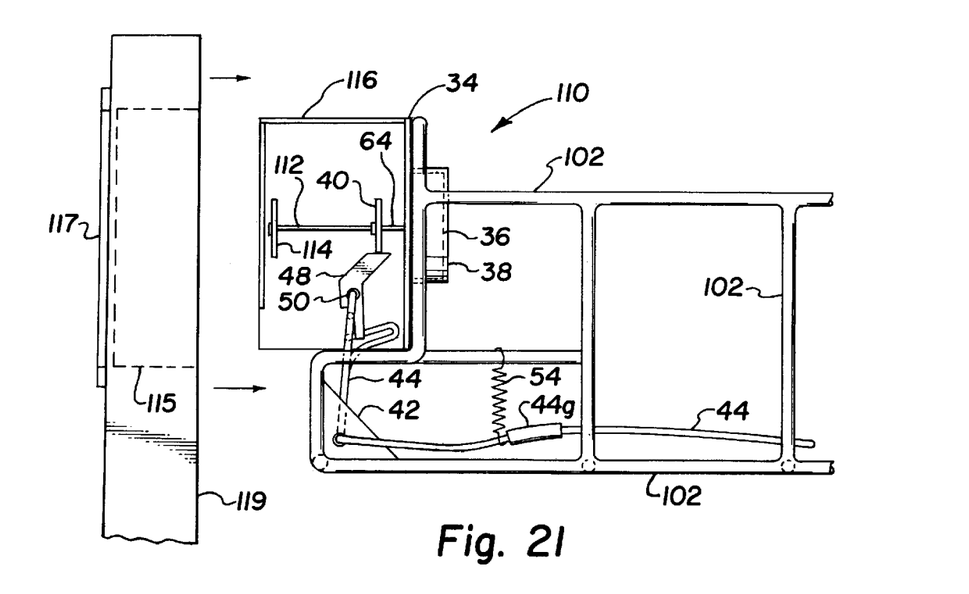
FIG. 21 is a side elevation of the built-in indicator, of FIG. 20.

FIGS. 20 and 21 show a built-in window indicator 110. Built-in window indicator 110 is an embodiment that allows the user to determine the clean or dirty condition of dishes from outside the dishwasher by viewing a secondary indicating pointer 114 through viewing window 117 of modified dishwasher door 119. Modified dishwasher door 119 would be furnished by the dishwasher manufacturer in place of a standard dishwasher door 118. Built-in window indicator 110 has several important modifications that make it different from built-in indicator 100. The purpose of the modifications is to ensure that the clean or dirty dish condition is easily determined by a user from outside the dishwasher, by locating secondary indicating pointer 114 in close proximity with viewing window 117, when modified dishwasher door 119 is in the closed position.

Built-in window indicator 110 starts with an extended shaft 112. Extended shaft 112 either replaces shaft 64 or is affixed the end of shaft 64 at the point where indicating pointer 40 is attached. A secondary indicating pointer 114 is affixed to the end of extended shaft 112, opposite the end affixed to bimetallic spring 36. Surrounding extended shaft 112 and secondary indicating pointer 114 is a shroud casing 116. Affixed to the front edge of shroud casing 116, in a plane paralleling the rotation of secondary indicating pointer 114, are sign members 39 containing the words clean and dirty. Sign members 39 are arranged so that secondary indicating pointer 114 will properly align itself with the words clean and dirty as it is rotated by bimetallic spring 36. Shroud casing 116 protects the components of built-in window indicator 110 from possible damage caused by water pressure or physical contact.

As shown in FIG. 21, modified dishwasher door 119 contains a door cavity 115. In the closed position, door cavity 115 surrounds shroud casing 116, putting secondary indicating pointer 114 in close proximity with viewing window 117. Other components of built-in window indicator 110, not specifically addressed in this section, are identical to indicator 30.

Referring now to FIG. 22, built-in rotating disk indicator 120 combines rotating-disk indicator 80 with built-in window indicator 110. Built-in rotating disk indicator 120 incorporates a secondary indicating disk 126, that replaces secondary indicating pointer 114. Affixed to the front of shroud casing 116 is a window plate 122. Within window plate 122 is a plate window 122a. Affixed to modified dishwasher door 119 is a disk viewing window 124. As with built-in window indicator 110, modified dishwasher door 119 includes a door cavity 115. In the closed position, door cavity 115 surrounds shroud casing 116 and window plate 122, putting secondary indicating disk 126 in close proximity with disk viewing window 124. The dishwasher user would view the condition of dishes from outside the dishwasher through disk viewing window 124 and plate window 122a. The advantage of built-in rotating disk indicator 120 is that it may also be more astetically appealing than built-in window indicator 110.

FIGS. 23 and 24 show an alternate embodiment that is applicable for any of the built-in indicator configurations. Contact switch 126 is an electrical switch with two electrical conductors 129. The two conductors are used by the dishwasher control system. One skilled in the art would need to determine an acceptable method for routing the electrical conductors 129 from the present invention to the dishwasher control system, without interfering with the normal movement of modified dish rack 61. Looping conductors 129 from modified dish rack 61 to an internal point of dishwasher 58 is one possible method for making the connection. A looped configuration would allow modified dish rack 61 to move normally. The looped conductor configuration is shown in FIG. 24.

Contact switch 126 is activated by the movement of indicating pointer 40 or indicating disk 84. The contact of indicating pointer 40 or indicating disk 84 with switch 126, closes the switch completing an electrical circuit. As indicating pointer 40 or indicating disk 84 moves away from contact switch 126, the switch will open. The opened or closed electrical circuit would then be used by the dishwasher control system to illuminate one or two light bulbs on the dishwasher's control panel to provide an indication of clean or dirty dish condition. One skilled in the art would need to design the dishwasher control system to utilize the electrical signal coming from contact switch 126.

The alternate embodiments shown in FIGS. 19 through 24 are some of the many variations possible for designing and building a built-in dishwasher clean/dirty indicator. One skilled in the art would realize that there are also many other variations and combinations that could be used to provide a workable arrangement.

OPERATION OF THE INVENTION

In operation, the preferred embodiments of the present invention may be used to provide a user with an indication of clean or dirty condition of dishes in a dishwasher. FIGS. 1 through 16 show various views and details of indicators 30, 70, 80, and 90 of the present invention which are portable configurations, meaning that they can be purchased as after-market items and placed in most consumer household-type dishwashers. FIGS. 19 through 24 show views and details of indicators 100, 110, and 120 of the present invention which are built-in configurations, meaning that they would be built-into the dishwasher by the dishwasher manufacturer.

To illustrate the operation of the portable configurations, indicator 30 will be used as the example. The operation of indicators 70, 80, and 90 would be identical to that of indicator 30. To begin, a user would initially locate indicator 30 in dishwasher 58 by placing it in one of the dishwasher's dish racks 60. No physical connections are required. It would be placed in a location where drinking glass 62 or similar dish normally sits, against the front edge of the dish rack. While usable on either the upper or lower rack, the user would normally prefer to place indicator 30 on the upper rack so it would be at the most convenient height for readability. When properly placed, indicator 30 would take-up less space than an ordinary drinking glass, resulting in minimal loss of usable dish washing space. Once located, indicator 30 would remain in the dishwasher indefinitely.

To operate indicator 30, a user would fill an empty dishwasher 58 in a normal fashion by placing dirty dishes in the dish racks. When the dishwasher is being loaded, indicating pointer 40 of indicator 30 would be aligned with the word dirty. To make indicator 30 operational, at least one drinking glass 62 or similar dish must be placed on release arm 44. Once dishwasher 58 is full, the user would add detergent and begin the dish washing cycle in a normal fashion. During the dishwashing cycle, heat introduced into the dishwasher will cause bimetallic spring 36 to move indicating pointer 40 to the clean position. Latch 48 would then hold indicating pointer 40 in the clean position until the dishwasher is unloaded.

After the dishwashing cycle is complete, the user would be able to determine that the dishes are clean by opening dishwasher door 118, and viewing the position of indicating pointer 40. Of course the real benefit of indicator 30 is that it will always show the clean or dirty condition of dishes when the condition is unknown. This situation may occur when the user forgets that he or she ran the dishwasher, or when a long period of time has elapsed since the dishwasher was run. More typically, however, the situation occurs when the dishwasher has multiple users. With the present invention, any user will always be able to determine the clean or dirty condition of dishes by viewing the position of indicating pointer 40 of indicator 30. The advantage of course is that a forgetful user, or multiple users will not mistakenly load dirty dishes into a dishwasher containing clean dishes.

In order to get the full benefit of indicator 30, it is best if drinking glass 62 or similar dish, resting on release arm 44, is removed last when the user is unloading the dishwasher. Removing drinking glass 62 last will ensure that indicator 30 provides an accurate reading at all times. Operating indicator 30 in this manner will allow the users to remove several dishes from a clean dishwasher when they need dishes in a hurry and don't have time to unload the entire dishwasher. When several dishes are removed, indicating pointer 40 will remain in the clean position, provided that the dish resting on release arm 44 is not removed. At a later time when another user approaches the dishwasher, he or she will know that the remaining dishes in the partially loaded dishwasher are clean. If necessary, this process could be repeated several times. Indicating pointer 40 would remain in the clean position until one of the users had time to completely unload the dishwasher. At that time, the user would remember to remove drinking glass 62 or similar dish from release arm 44 last. At the instant the dish is removed, indicating pointer 40 would automatically return to the dirty position.

The preceding discussion explains the operation of the portable configurations, indicators 30, 70, 80, and 90 of the present invention. The operation of built-in indicator 100 is identical to that of the portable configurations except for the fact that it would require no initial placement in dishwasher 58 since it would be built-in to the dishwasher by the dishwasher manufacturer. Indicators 110 and 120 also require no initial placement since they would be built-in to the dishwasher. The operation of indicators 110 and 120 is also identical to the others expect for the fact that the user would view the clean or dirty condition of dishes from outside the dishwasher through viewing window 117 or 124, instead of first opening the dishwasher door and viewing the dish condition from inside the dishwasher, as required for indicators 30, 70, 80, 90, and 100.

CONCLUSION, RAMIFICATIONS, AND SCOPE OF THE INVENTION

As set forth hereinabove, the present invention seeks to provide an improved indicator for a dishwasher that automatically shows the clean or dirty condition of dishes in the dishwasher, without manual intervention by the user. The present invention will ensure that the indicator automatically registers dirty as soiled dishes are being loaded into the dishwasher, and stays in the dirty position until the dishwashing cycle is activated. The present invention will also ensure that the indicator automatically moves from the dirty position to the clean position during the dishwashing cycle. Furthermore, the present invention will ensure that after completion of the dishwashing cycle, the indicator remains in the clean position for partially unloaded dishwashers, and that it automatically re-sets itself to the dirty position upon removal of the last dish, as the dishwasher is being fully unloaded. Finally, the present invention has both portable and built-in configurations that can be placed in existing dishwashers, or manufactured into new dishwashers, respectively, with no user installation requirements.

While the present invention has been particularly shown and described with reference to the preferred embodiments, it will be understood by those skilled in the art that various changes in form and detail may be made therein without departing from the spirit and scope of the invention. For example, frame 32 could be shaped into a number of acceptable configurations and still maintain its functional characteristics. Also, FIGS. 4 and 5 imply an overall length of frame 32 relative to a common drinking glass 62. The figures imply that release arm 44 is only large enough to support one drinking glass. In reality, it may be beneficial for frame 32 and release arm 44 to be significantly longer in the longitudinal direction of the present invention, so these components could support more than one dish. Supporting more than one dish would enhance the operation and usability of the present invention by requiring the removal of several dishes, rather than one, before indicator 30 automatically resets itself to the dirty position. The necessity to remove several dishes would provide a higher degree of certainty that the dishwasher has been fully emptied when indicator 30 automatically changes from clean to dirty.

As another example of alternate forms and detail that would be covered by the spirit of this invention, FIG. 1 and other relevant illustrations show release arm 44 pivoting along an axis that is perpendicular to the longitudinal frame axis of indicator 30. One skilled in the art would realize that it would also be possible to arrange a configuration where release arm 44 pivots along an axis that is parallel to the longitudinal axis, adjacent to one of the frame side rods 32*a*. A configuration of this type may work well in conjunction with an extended frame arrangement discussed in the preceding paragraph.

An additional possibility that falls within the spirit of this invention is related to the contact switch arrangement shown in FIGS. 23 and 24. Instead of triggering contact switch 126 by indicating pointer 40, the switch could be operated by the movement of release arm 44. The switch would be closed when a drinking glass 62 is resting on the release arm and open when the glass or similar dish is removed. A signal from the switch in conjunction with a cycle-completion signal from the dishwasher's control system, could be used to provide an indication of clean or dirty dish condition on the dishwasher's control panel by illuminating one or two light bulbs, as described by the present invention. With this arrangement, heat introduced to the dishwasher during a normal dishwashing cycle would no longer be a factor, which would eliminate the need for the bimetallic spring 36 and indicating pointer 40.

Finally, one skilled in the art would realize that it is possible to assemble various features of the described embodiments in other acceptable combinations. As an example of the many combinations that are possible, one skilled in the art would realize that combined-release arm 92 of simplified indicator 90, could easily be incorporated into rotating-disk indicator 80 or built-in indicator 100.

While the specific embodiments have been illustrated and described in significant detail, numerous modifications come to mind without significantly departing from the spirit of the invention and therefore, the scope of protection is only limited by the scope of the accompanying claims and their legal equivalents.

I claim:

1. A dishwasher indicating device for indicating the clean or dirty condition of items in a dishwasher, said dishwasher indicating device comprising:

a frame for mounting components of said dishwasher indicating device, said frame comprising bearing surfaces at predetermined locations;

an indicator with a latching point, said indicator for showing a user of said dishwasher the clean or dirty condition of the items in said dishwasher;

a heat activated rotational means comprising a shaft of predetermined length, said rotational means being supported by said frame and being configured for moving said indicator to a clean indicating position when heat is applied to the rotational means;

a latch configured to latch said indicator in the clean indicating position upon said application of said heat;

a release arm connected to said latch, said release arm being movable at said bearing surfaces of said frame to an unloaded position where said latch is moved away from said latching point of said indicator, allowing the indicator to move to a dirty indicating position; and a retracting means for biasing said release arm to said unloaded position;

whereby the user of said dishwasher indicating device can determine from said indicator when the items in said dishwasher are clean or dirty.

2. The dishwasher indicating device according to claim 1 wherein said indicator is a pointer.

3. The dishwasher indicating device according to claim 1 wherein said indicator is a rotating disk including sign members with the words clean and dirty.

4. The dishwasher indicating device according to claim 3 wherein the frame further includes disk stops affixed thereto for limiting travel of said rotating disk.

5. The dishwasher indicating device according to claim 1 wherein said heat activated rotational means is a bimetallic spring.

6. The dishwasher indicating device according to claim 1 wherein said latch is a pivoting latch, arranged to pivot at a predetermined location on said release arm.

7. The dishwasher indicating device according to claim 6 wherein said release arm further includes latch retainers affixed thereto for retaining said pivoting latch.

8. The dishwasher indicating device according to claim 1 wherein said latch is a flexible latch affixed to said release arm, wherein said flexible latch is comprised of material that is bendable.

9. The dishwasher indicating device according to claim 1 wherein said release arm comprises flexible material allowing said release arm to flex when one of said items is placed on said release arm.

10. The dishwasher indicating device according to claim 1 wherein said retracting means is a coil spring.

11. The dishwasher indicating device according to claim 1 wherein said retracting means is a leaf spring.

12. The dishwasher indicating device according to claim 1 wherein said frame further includes a faceplate.

13. The dishwasher indicating device according to claim 12, wherein said faceplate includes sign members with the words clean and dirty.

14. The dishwasher indicating device according to claim 12, wherein said faceplate includes color coding to provide the user with a visual indication of the clean or dirty condition.

15. The dishwasher indicating device according to claim 1 further including a protective enclosure surrounding at least a portion of said frame.

16. A dishwasher comprising a dishwasher indicating device for indicating the clean or dirty condition of items therein, said dishwasher having a door, a control system, and a movable rack for supporting the items, said dishwasher indicating device comprising:

a frame for mounting components of said dishwasher indicating device, said frame comprising bearing surfaces at predetermined locations, said frame engaging said rack;

an indicator with a latching point, said indicator for showing a user of said dishwasher the clean or dirty condition of the items in said dishwasher;

a heat activated rotational means comprising a shaft of predetermined length, said rotational means being supported by said frame and being configured for moving said indicator to a clean indicating position when heat is applied to the rotational means;

a latch configured to latch said indicator in the clean indicating position upon said application of said heat;

a release arm connected to said latch, said release arm being movable at said bearing surfaces of said frame to an unloaded position where said latch is moved away from said latching point of said indicator, allowing the indicator to move to a dirty indicating position; and a retracting means for biasing said release arm to said unloaded position;

whereby the user of said dishwasher indicating device can determine from said indicator when the items in said dishwasher are clean or dirty.

17. The dishwasher according to claim 16 wherein said frame is integral with said movable rack.

18. The dishwasher according to claim 16 wherein said shaft of said heat activated rotational means further includes a secondary indicator thereon, said shaft being of adequate length to extend the secondary indicator into the vicinity of said door of said dishwasher.

19. The dishwasher according to claim 16 wherein said door of said dishwasher includes a viewing window for allowing said user to view the position of said secondary indicator from a location external to said dishwasher.

20. The dishwasher according to claim 16 further including a contact switch positioned at a predetermined location for providing said dishwasher control system with an electrical signal indicating the clean or dirty condition of said items by completing an electrical circuit when said contact switch is triggered by movement of a component of said indicating device.

* * * * *